US012620811B2

(12) United States Patent
Guan et al.

(10) Patent No.: US 12,620,811 B2
(45) Date of Patent: May 5, 2026

(54) GRID-CONNECTED POWER REGULATION METHOD FOR ENERGY STORAGE CONVERTER, AND COMPUTER-READABLE STORAGE MEDIUM AND ENERGY STORAGE CONVERTER

(71) Applicant: JINGTSING TECHNOLOGY LTD, Beijing (CN)

(72) Inventors: Eryong Guan, Beijing (CN); Ruiqiu Ji, Beijing (CN)

(73) Assignee: JINGTSING TECHNOLOGY LTD, Beijing (CN)

( * ) Notice: Subject to any disclaimer, the term of this patent is extended or adjusted under 35 U.S.C. 154(b) by 195 days.

(21) Appl. No.: 18/689,463

(22) PCT Filed: Mar. 25, 2022

(86) PCT No.: PCT/CN2022/083095
§ 371 (c)(1),
(2) Date: Mar. 6, 2024

(87) PCT Pub. No.: WO2023/092917
PCT Pub. Date: Jun. 1, 2023

(65) Prior Publication Data
US 2024/0372373 A1 Nov. 7, 2024

(30) Foreign Application Priority Data
Nov. 25, 2021 (CN) .......................... 202111413225.6

(51) Int. Cl.
*H02J 3/388* (2026.01)
*H02J 3/32* (2006.01)
(Continued)

(52) U.S. Cl.
CPC ................ *H02J 3/388* (2020.01); *H02J 3/32* (2013.01); *H02M 1/0019* (2021.05); *H02M 7/53871* (2013.01); *H02J 2103/35* (2026.01)

(58) Field of Classification Search
CPC .......... H02J 3/388; H02J 3/32; H02J 2203/10; H02J 3/16; H02J 2300/28; H02J 3/381; (Continued)

(56) References Cited

U.S. PATENT DOCUMENTS

2019/0109461 A1* 4/2019 Khajehoddin .......... H02M 1/42

FOREIGN PATENT DOCUMENTS

| CN | 102780222 A | 11/2012 |
|---|---|---|
| CN | 103401259 A | * 11/2013 |

(Continued)

OTHER PUBLICATIONS

Khanabdal et al. , "Virtual Flux Droop Control with Constant Switching Frequency for Power Sharing Between Parallel Inverters in Islanded Microgrids," 2019 27th Iranian Conference on Electrical Engineering (ICEE), Yazd, Iran, 2019, pp. 868-874. (Year: 2019).*

(Continued)

*Primary Examiner* — Daniel Cavallari
(74) *Attorney, Agent, or Firm* — Scully, Scott, Murphy & Presser, P.C.

(57) ABSTRACT

An energy storage converter, a control method and device for the energy storage converter, and a computer readable storage medium are provided. The control method includes: obtaining an operation state of a power grid; under the condition that the power grid operates in a normal state, controlling the energy storage converter to operate in a grid-connected mode; and under the condition that the power grid operates in an abnormal state, controlling the energy storage converter to operate in an island mode. In the grid-connected mode, the energy storage converter uses
(Continued)

active power and reactive power decoupling control. In the island mode, the energy storage converter uses virtual magnetic flux control.

15 Claims, 8 Drawing Sheets

(51) Int. Cl.
    *H02M 1/00*      (2006.01)
    *H02M 7/5387*    (2007.01)
    *H02J 103/35*     (2026.01)

(58) Field of Classification Search
    CPC .... H02J 3/38; H02M 1/0019; H02M 7/53871; H02M 7/5395; H02M 7/487; H02M 7/217
    See application file for complete search history.

(56)              References Cited

FOREIGN PATENT DOCUMENTS

| | | |
|---|---|---|
| CN | 110224439 A | 9/2019 |
| CN | 110277803 A | 9/2019 |
| CN | 110943468 A | 3/2020 |
| CN | 112086970 A | 12/2020 |
| CN | 114039382 A | 2/2022 |

OTHER PUBLICATIONS

First Office Action dated Feb. 22, 2024 received in Chinese Patent Application No. 202111413225.6.

International search report dated Aug. 4, 2022 received in International Application No. PCT/CN2022/083095.

Khanabdal, S. et al., "Virtual Flux Droop Control With Constant Switching Frequency For Power Sharing Between Parallel Inverters in Islanded Microgrids", 27th Iranian Conference on Electrical Engineering (JCEE2019), Aug. 2019, pp. 868-874.

Khanabdal, S. et al., "Adaptive Virtual Flux Droop Control Based on Virtual Impedance in Islanded AC Microgrids", IEEE Journal of Emerging and Selected Topics in Power Electronics, Aug. 2021, pp. 1095-1107, vol. 10, No. 1.

Supplementary European search report dated Oct. 28, 2025 received in European Patent Application No. 22897018.2.

Hao, D. et al., "Coordinated control of MT and ESS in an islanded AC/DC hybrid microgrid", 2018 International Conference on Power System Technology (Powercon), IEEE, Nov. 2018, pp. 2070-2077.

Xu, J. et al., "Offline Converter Undisturbed Grid-connected Strategy Based on Virtual Synchronous Generator Control", 2021 13th IEEE PES Asia Pacific Power & Energy Engineering Conference (APPEEC), IEEE, Nov. 2021, pp. 1-6.

* cited by examiner

GRID-CONNECTED POWER REGULATION METHOD FOR ENERGY STORAGE CONVERTER, AND COMPUTER-READABLE STORAGE MEDIUM AND ENERGY STORAGE CONVERTER

CROSS-REFERENCE TO RELATED APPLICATIONS

This application is a National Stage Entry under 35 U.S.C. § 371 of PCT International Application No. PCT/CN2022/083095, filed on Mar. 25, 2022, which claims priority to Chinese Patent Application No. 202111413225.6 filed with China National Intellectual Property Administration on Nov. 25, 2021 and entitled "ENERGY STORAGE CONVERTER, CONTROL METHOD AND DEVICE THEREFOR, AND COMPUTER READABLE STORAGE MEDIUM", the entire contents of each of which are herein incorporated by reference.

FIELD

The present disclosure relates to the field of control technologies, and specifically, relates to an energy storage converter, a control method and a device therefor, and a computer readable storage medium.

BACKGROUND

An energy storage converter is usually connected to a power grid, and the conversion between a direct-current and an alternating-current is conducted through limiting the charging and discharging process of a battery.

A person skilled in the art found that the energy storage converter could not provide supports of voltage and frequency, and could not provide power for important or sensitive loads once the power grid fails.

SUMMARY

The present disclosure aims to solve at least one of the problems in the prior art or the related art.

Therefore, the first aspect of the present disclosure provides a control method for an energy storage converter.

The second aspect of the present disclosure provides a control device of an energy storage converter.

The third aspect of the present disclosure provides another control device of an energy storage converter.

The fourth aspect of the present disclosure provides a computer readable storage medium.

The fifth aspect of the present disclosure provides an energy storage converter.

In view of this, according to the first aspect of the present disclosure, the present disclosure provides a control method for an energy storage converter, the energy storage converter is connected to a power grid, and the control method comprises: obtaining an operation state of the power grid; limiting the energy storage converter to operate in a grid-connected mode under the condition that the power grid operates in a normal state; and limiting the energy storage converter to operate in an island mode under the condition that the power grid operates in an abnormal state, wherein in the grid-connected mode, the energy storage converter uses active power and reactive power decoupling control, and in the island mode, the energy storage converter uses virtual magnetic flux control.

The embodiment of the present disclosure provides a control method for an energy storage converter, in the control method, through obtaining the operation state of the power grid, the energy storage converter is limited to enter different control modes according to the operation state of the power grid; in the grid-connected mode, the decoupling control is conducted according to the active power and the reactive power, so as to maintain a balance of the active power and the reactive power according to a scheduling instruction of an upper level and provide qualified electrical energy to the power grid. However, in the island mode, the virtual magnetic flux control is adopted, so as to quickly establish voltage and frequency support for the local, and supply a reliable electrical energy quality for important loads and sensitive loads.

In addition, the control method for an energy storage converter provided in the present disclosure further comprises the following additional features.

In the above embodiments, limiting the energy storage converter to operate in a grid-connected mode comprises: obtaining a first current value on the power grid and a first voltage value of a capacitor on the power grid; determining a first angle value according to the first voltage value; determining a second voltage value, a third voltage value, a second current value and a third current value according to the first voltage value and the first current value; receiving an active power instruction value and a reactive power instruction value; determining a first instruction current value and a second instruction current value according to the active power instruction value, the reactive power instruction value, the second voltage value and the third voltage value; inputting the second current value, the third current value, the first instruction current value and the second instruction current value into a proportional integral controller, to render a first output result; and determining a first pulse width modulation signal according to the first output result, a feedback voltage of the power grid and the first angle value, and limiting the energy storage converter to operate according to the first pulse width modulation signal.

In the embodiment, in the grid-connected mode, the power grid can maintain the stability of the voltage and the frequency, and therefore, after the active power instruction value and the reactive power instruction value are received, it is only necessary to control the output current of an inverter in the energy storage converter and then the control of power is achieved.

In one of the embodiments, limiting the energy storage converter to operate in an island mode comprises: obtaining the first current value on the power grid and the first voltage value of the capacitor on the power grid; determining the first angle value according to the first voltage value; determining the second voltage value, the third voltage value, the second current value and the third current value according to the first voltage value and the first current value; receiving a given voltage value of the capacitor on the power grid; inputting the given voltage value, the second voltage value and the third voltage value into the proportional integral controller to render a second output result; inputting the second output result, the second current value and the third current value into the proportional integral controller to render a third output result; receiving a given angle value and inputting the given angle value and the first angle value into the proportional integral controller to render a fourth output result; and determining a second pulse width modulation signal according to the third output result, the feedback voltage of the power grid and the fourth output result, and limiting the energy storage converter to operate according to the second pulse width modulation signal.

In the embodiment, the virtual magnetic flux control is added a frequency outer loop controller to stabilize the output frequency, and therefore, the stability of the frequency output by the energy storage converter is enhanced.

In one of the embodiments, in response to a first instruction, limiting the energy storage converter to operate according to the angle information and the compensation voltage value output by a virtual synchronous generator.

In the embodiment, the first instruction can be an inputted or generated instruction when users need the power grid to have the inertial requirements of a traditional power grid.

In the embodiment, a virtual synchronous machine is adopted for control. Traditional droop control is a preliminary simulation of the external characteristics of synchronous generators; in order to further simulate the inertia and damping characteristics of synchronous generators, a virtual synchronous generator VSG (Virtual Synchronous Generator) introduces a moment of inertia and a damping coefficient on the basis of the droop control, and thus the ability of suppressing interference and fluctuations is enhanced. By proposing a strategy of collaborative self-adaptive control of the moment of inertia and the damping coefficient, the change rate and the offset of the frequency are effectively suppressed.

In one of the embodiments, limiting the energy storage converter to operate according to the angle information and the compensation voltage value output by a virtual synchronous generator comprises: determining an angle instruction value according to the angle information; obtaining the first current value on the power grid and the first voltage value of the capacitor on the power grid; determining the first angle value according to the first voltage value; determining the second voltage value, the third voltage value, the second current value and the third current value according to the first voltage value and the first current value; receiving the given voltage value of the capacitor on the power grid; inputting the compensation voltage value, the given voltage value, the second voltage value and the third voltage value into the proportional integral controller to render a fifth output result; inputting the fifth output result, the second current value and the third current value into the proportional integral controller to render a sixth output result; inputting the angle instruction value and the first angle value into the proportional integral controller to render a seventh output result; and determining a third pulse width modulation signal according to the sixth output result, the feedback voltage of the power grid and the seventh output result, and limiting the energy storage converter to operate according to the third pulse width modulation signal.

In one of the embodiments, in the case that an electrical signal transmitted by the power grid is received, it is determined that the power grid operates in the normal state; in the case that the electrical signal transmitted by the power grid is not received, it is determined that the power grid operates in the abnormal state.

According to the second aspect of the present disclosure, the present disclosure provides a control device of an energy storage converter, the energy storage converter is connected to a power grid, and the control device comprises: an acquiring unit, used for obtaining the operation state of the power grid; a control unit, used for limiting the energy storage converter to operate in a grid-connected mode in the case that the power grid operates in a normal state; in the case that the power grid operates in an abnormal state, the energy storage converter is limited to operate in an island mode, wherein in the grid-connected mode, the energy storage converter uses active power and reactive power decoupling control, and in the island mode, the energy storage converter uses virtual magnetic flux control.

In addition, the control device of an energy storage converter provided in the present disclosure further comprises the following additional features.

In the above embodiments, the control unit is specifically used for: obtaining the first current value on the power grid and the first voltage value of the capacitor on the power grid; determining the first angle value according to the first voltage value; determining the second voltage value, the third voltage value, the second current value and the third current value according to the first voltage value and the first current value; receiving the active power instruction value and the reactive power instruction value; determining the first instruction current value and the second instruction current value according to the active power instruction value, the reactive power instruction value, the second voltage value and the third voltage value; inputting the second current value, the third current value, the first instruction current value and the second instruction current value into the proportional integral controller, to render the first output result; and determining the first pulse width modulation signal according to the first output result, the feedback voltage of the power grid and the first angle value, and limiting the energy storage converter to operate according to the first pulse width modulation signal.

In the above embodiment, the control unit is specifically used for: obtaining the first current value on the power grid and the first voltage value of the capacitor on the power grid; determining the first angle value according to the first voltage value; determining the second voltage value, the third voltage value, the second current value and the third current value according to the first voltage value and the first current value; receiving a given voltage value of the capacitor on the power grid; inputting the given voltage value, the second voltage value and the third voltage value into the proportional integral controller to render a second output result; inputting the second output result, the second current value and the third current value into the proportional integral controller to render a third output result; receiving a given angle value and inputting the given angle value and the first angle value into the proportional integral controller to render a fourth output result; and determining a second pulse width modulation signal according to the third output result, the feedback voltage of the power grid and the fourth output result, and limiting the energy storage converter to operate according to the second pulse width modulation signal.

In the above embodiment, the control unit is also used for: in response to the first instruction, limiting the energy storage converter to operate according to the angle information and the compensation voltage value output by a virtual synchronous generator.

In one of the embodiments, the control unit is specifically used for: determining the angle instruction value according to the angle information; obtaining the first current value on the power grid and the first voltage value of the capacitor on the power grid; determining the first angle value according to the first voltage value; determining the second voltage value, the third voltage value, the second current value and the third current value according to the first voltage value and the first current value; receiving the given voltage value of the capacitor on the power grid; inputting the compensation voltage value, the given voltage value, the second voltage value and the third voltage value into the proportional integral controller to render the fifth output result; inputting the fifth output result, the second current value and the third current value into the proportional integral controller to render the sixth output result; inputting the angle instruction value and the first angle value into the proportional integral controller to render a seventh output result; and determining the third pulse width modulation signal according to the sixth output result, the feedback voltage of the power grid and the seventh output result, and limiting the energy storage converter to operate according to the third pulse width modulation signal.

In one of the embodiments, the control unit is specifically used for: in the case that the electrical signal transmitted by the power grid is received, determining that the power grid operates in the normal state; in the case that the electrical signal transmitted by the power grid is not received, determining that the power grid operates in the abnormal state.

According to the third aspect of the present disclosure, the present disclosure provides a control device of an energy storage converter, the energy storage converter is connected to a power grid, and the control device comprises a storage and a processor, a program is stored in the storage, when the processor executes the program, the steps of the control method for an energy storage converter of any of the above solutions are achieved.

According to the fourth aspect of the present disclosure, the present disclosure provides a computer readable storage medium, on which a program or an instruction is stored, when the program or the instruction is executed by a processor, the steps of the control method for an energy storage converter of any of the above solutions are achieved.

According to the fifth aspect of the present disclosure, the present disclosure provides an energy storage converter, comprising: the control device of an energy storage converter according to any of the above solutions; or the above computer readable storage medium.

The additional aspects and advantages of the present disclosure will be obvious in the following description, or can be understood through the implementation of the present disclosure.

BRIEF DESCRIPTION OF THE DRAWINGS

The above and/or additional aspects and advantages of the present disclosure will be obvious and understood easily from the following description of the embodiments in combination with the accompanying drawings. Wherein.

Wherein, the corresponding relationships between the reference signs and the component names in FIG. 7 to FIG. 11 are as follows:

700 bridge arm; 710 first switch assembly; 712 first switch tube; 714 first diode; 720 second switch assembly; 722 second switch tube; 724 second diode; 730 third switch assembly; 732 third switch tube; 734 third diode; 740 fourth switch assembly; 742 fourth switch tube; 744 fourth diode; 750 fifth switch assembly; 752 fifth switch tube; 754 fifth diode; 760 sixth switch assembly; 762 sixth switch tube; 764 sixth diode; 770 resistor assembly; 772 first resistor; 774 second resistor; 776 third resistor; 782 first capacitor; 784 second capacitor; 792 first module; 794 second module; 796 third module; and 800 heat sink.

DETAILED DESCRIPTION OF THE DISCLOSURE

To more clearly understand the above purposes, features and advantages of the present disclosure, the present disclosure will be further detailed hereinafter in combination with the accompanying drawings and embodiments. It should be indicated that in the case of no conflict, the embodiments and the features in the embodiments of the present disclosure can be combined with each other.

Many details are illustrated in the following description for the convenience of a thorough understanding to the present disclosure, but the present disclosure can also be implemented using other embodiments other than these described herein. Therefore, the protection scope of the present disclosure is not limited to the specific embodiments disclosed in the following text.

Figure 1:
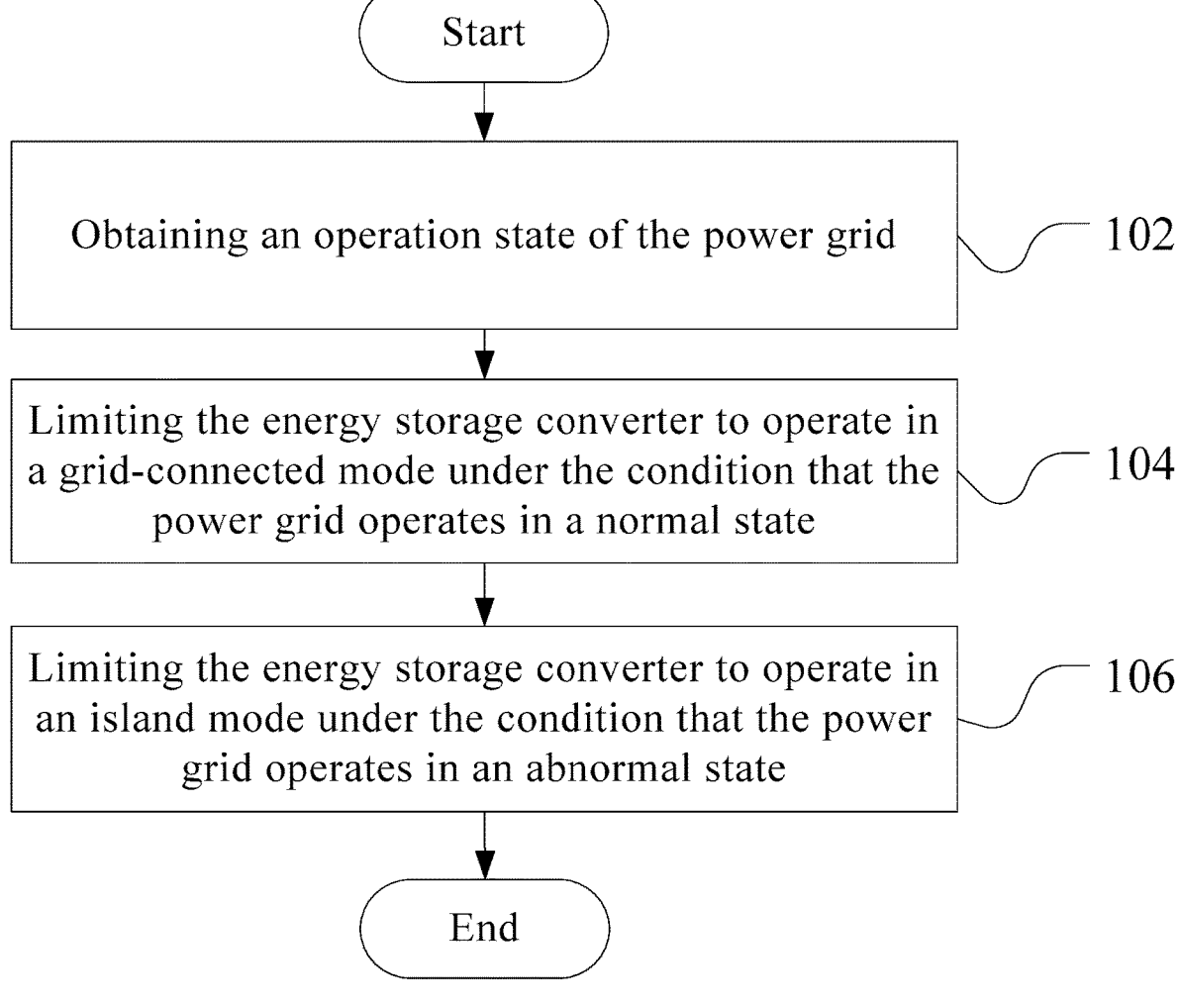
FIG. 1 is a schematic view of the flow of a control method for an energy storage converter according to an embodiment of the present disclosure.

As shown in FIG. 1, according to the first aspect of the present disclosure, the present disclosure provides a control method for an energy storage converter, the energy storage converter is connected to a power grid, and the control method comprises:

step 102: obtaining an operation state of the power grid;

step 104: limiting the energy storage converter to operate in a grid-connected mode under the condition that the power grid operates in a normal state; and step 106: limiting the energy storage converter to operate in an island mode under the condition that the power grid operates in an abnormal state, Wherein, in the grid-connected mode, the energy storage converter uses active power and reactive power decoupling control, and in the island mode, the energy storage converter uses virtual magnetic flux control.

The embodiments of the present disclosure provides a control method for an energy storage converter, in the control method, through obtaining the operation state of the power grid, the energy storage converter is limited to enter different control modes according to the operation state of the power grid; in the grid-connected mode, the decoupling control is conducted according to the active power and the reactive power, so as to maintain a balance of the active power and the reactive power according to a scheduling instruction of an upper level and provide qualified electrical energy to the power grid. However, in the island mode, the virtual magnetic flux control is adopted, so as to quickly establish voltage and frequency support for the local, and supply a reliable electrical energy quality for important loads and sensitive loads.

In the above embodiments, limiting the energy storage converter to operate in a grid-connected mode comprises: obtaining a first current value on the power grid and a first voltage value of a capacitor on the power grid; determining a first angle value according to the first voltage value; determining a second voltage value, a third voltage value, a second current value and a third current value according to the first voltage value and the first current value; receiving an active power instruction value and a reactive power instruction value; determining a first instruction current value and a second instruction current value according to the active power instruction value, the reactive power instruction value, the second voltage value and the third voltage value; inputting the second current value, the third current value, the first instruction current value and the second instruction current value into a proportional integral controller, to render a first output result; and determining a first pulse width modulation signal according to the first output result, a feedback voltage of the power grid and the first angle value, and limiting the energy storage converter to operate according to the first pulse width modulation signal.

In the embodiment, in the grid-connected mode, the power grid can maintain the stability of the voltage and the frequency, and therefore, after the active power instruction value and the reactive power instruction value are received, it is only necessary to control the output current of an inverter in the energy storage converter and then the control of power is achieved. It is understandable that the active power and reactive power decoupling control is a current source control.

Specifically, the active power and reactive power decoupling control will receive an active power instruction value P*, a reactive power instruction value Q*, a current instruction is calculated by the combination of formula (1) and formula (2), so that a current closed-loop control is achieved, i.e., the active power and reactive power decoupling control in the above text, i.e., P/Q power decoupling control.

$$i_{Ld}^* = \frac{2(P*u_d - Q*u_q)}{3(u_{Cd}^2 + u_{Cq}^2)};\qquad(1)$$

$$i_{Lq}^* = \frac{(2(P*u_q + Q*u_d)}{3(u_{Cd}^2 + u_{Cq}^2)};\qquad(2)$$

Wherein, $u_d$, $u_q$ are grid-side voltages, i.e., the feedback voltages of the power grid, $$i_{Ld}^* \text{ and } i_{Lq}^*$$

are instruction currents.

Figure 2:
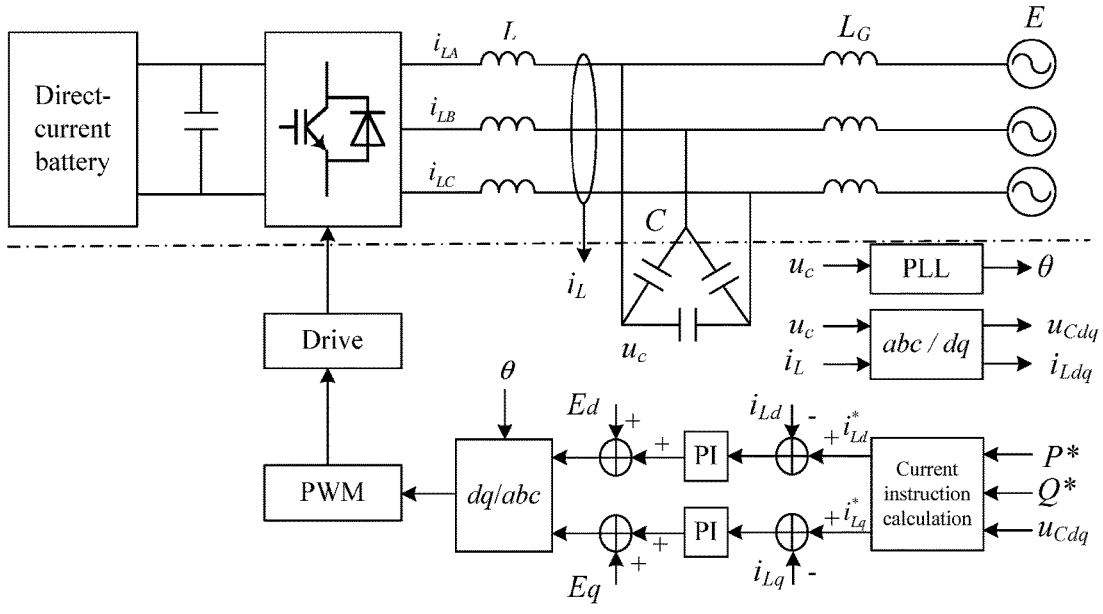
FIG. 2 is a schematic view of the control of a grid-connected mode according to an embodiment of the present disclosure.

Specifically, as shown in FIG. 2, above the dot dash line is a power portion, which is the major loop circuit of a converter, and is constituted by a direct-current battery, a semiconductor topology circuit, a filter L and C, and an equivalent reactance $L_G$ of the power grid. Below the dot dash line is a control portion, firstly, a capacitor voltage $u_c$ (i.e., the first voltage value in the present disclosure) and a current $i_L$ (i.e., the first current value in the present disclosure) are measured by a voltage sensor and a current sensor, and then converted into an angle $\theta$ (i.e., the first angle value of the present disclosure) by a PLL module (Phase Locked Loop), and the voltage $u_c$ and the current $i_L$ are converted into $u_{Cdq}$ and $i_{Ldq}$ based on abc-dq transformation, wherein, the $u_{Cdq}$ comprises two portions, i.e., $u_{Cd}$ and $u_{Cq}$, and the $i_{Ldq}$ comprises the portions of $i_{Ld}$ and $i_{Lq}$ (i.e., $u_{Cd}$ is the second voltage value in the present disclosure, $u_{Cq}$ is the third voltage value in the present disclosure, $i_{Ld}$ is the second current value and $i_{Lq}$ is the third current value in the present disclosure). Then, according to the above formulas (1) and (2), the active power instruction value P*, the reactive power instruction value Q* and the $u_{Cdq}$ are known, and then $$i_{Ld}^* \text{ and } i_{Lq}^*$$

(i.e., the first instruction current value and the second instruction current value in the present disclosure) can be calculated, an instruction value (i.e., the first output result in the present disclosure) of the voltage of the power grid is rendered through the proportional integral controller of the current measurement values $i_{Ld}$ and $i_{Lq}$, and then compared with the feedback value (i.e., the feedback voltage of the power grid in the present disclosure) of the voltage of the power grid, then a direct-current component is transformed into a three-phase alternating-current volume through the dq-abc conversion, a pulse signal (i.e., the first pulse width modulation signal in the present disclosure) is generated using a pulse width modulation signal generator, and a semiconductor in a major loop is driven through a driver.

In one of the embodiments, limiting the energy storage converter to operate in an island mode comprises: obtaining the first current value on the power grid and the first voltage value of the capacitor on the power grid; determining the first angle value according to the first voltage value; determining the second voltage value, the third voltage value, the second current value and the third current value according to the first voltage value and the first current value; receiving a given voltage value of the capacitor on the power grid; inputting the given voltage value, the second voltage value and the third voltage value into the proportional integral controller to render a second output result; inputting the second output result, the second current value and the third current value into the proportional integral controller to render a third output result; receiving a given angle value and inputting the given angle value and the first angle value into the proportional integral controller to render a fourth output result; and determining a second pulse width modulation signal according to the third output result, the feedback voltage of the power grid and the fourth output result, and limiting the energy storage converter to operate according to the second pulse width modulation signal.

In the embodiment, the virtual magnetic flux control is a voltage source control that simulates the magnetic flux of a motor, and its core is to control the amplitude and frequency of the voltage, quickly establish a voltage and frequency support for the local in an accurate power mode, and provide reliable electrical energy quality to important loads and sensitive loads. This control adopts a typical double closed loop control structure of a voltage outer loop and a current inner loop, wherein a voltage outer loop controller achieves that the inverter outputs the voltage stably; in addition, a frequency outer loop controller is added to stabilize the output frequency, and therefore, the stability of the frequency output by the energy storage converter is enhanced. Specifically, the added frequency outer loop controller is used for stabilizing the output frequency, as shown by the dotted section in FIG. 3.

Figure 3:
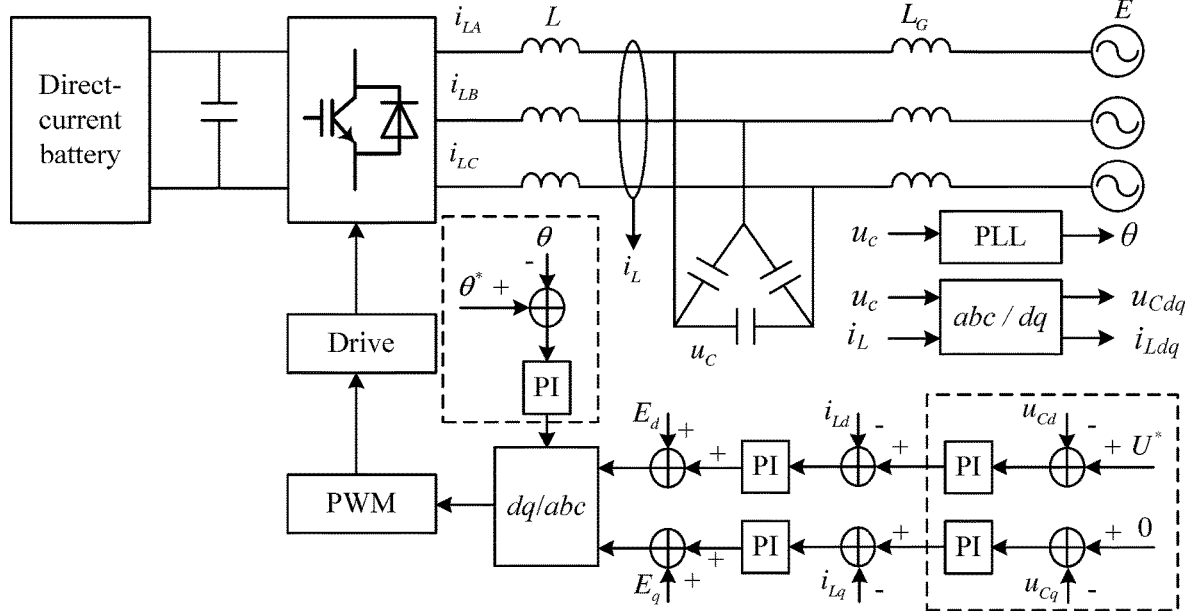
FIG. 3 is a schematic view of the control of an island mode according to an embodiment of the present disclosure.

In the virtual magnetic flux control, as shown in FIG. 3, firstly, the capacitor voltage $u_c$ (i.e., the first voltage value in the present disclosure) and the current $i_L$ (i.e., the first current value in the present disclosure) are measured by the voltage sensor and the current sensor, and then converted into an angle $\theta$ (i.e., the first angle value of the present disclosure) by the PLL module, and the voltage $u_c$ and the current $i_L$ are converted into $u_{Cdq}$ and $i_{Ldq}$ based on abc-dq transformation, wherein, the $u_{Cdq}$ comprises two portions, i.e., $u_{Cd}$ and $u_{Cq}$, and the $i_{Ldq}$ comprises the portions of $i_{Ld}$ and $i_{Lq}$ (i.e., $u_{Cd}$ is the second voltage value in the present disclosure, $u_{Cq}$ is the third voltage value in the present disclosure, $i_{Ld}$ is the second current value and $i_{Lq}$ is the third current value in the present disclosure). Then, based on an instruction value [U*, 0] (i.e. the given voltage value in the present disclosure) of a capacitor voltage, they are compared with $u_{Cd}$ and $u_{Cq}$, a second output result is rendered through the proportional integral controller, i.e., $$i_{Ld}^* \text{ and } i_{Lq}^*,$$

and the second output result, the $i_{Ld}$ and $i_{Lq}$ are input into the proportional integral controller, to render a third output result and then, the instruction value of the voltage of the power grid is rendered, and then compared with the feedback value (i.e., the feedback voltage of the power grid in the present disclosure) of the voltage of the power grid, then a direct-current component is transformed into a three-phase alternating-current volume through the dq-abc conversion, a pulse signal (i.e., the second pulse width modulation signal in the present disclosure) is generated using a pulse width modulation signal generator, and a semiconductor in the major loop is driven through a driver. Being different from that the PLL directly generates a frequency signal, the instruction value $\theta^*$ (i.e., the given angle value of the present disclosure) of the angle needs to be provided herein, then is compared with a measurement value $\theta$ (i.e., the first angle value of the present disclosure), and then an angle signal (i.e., the fourth output result in the present disclosure) is generated through the proportional integral controller.

In one of the embodiments, in response to a first instruction, limiting the energy storage converter to operate according to the angle information and the compensation voltage value output by a virtual synchronous generator.

In the embodiment, the first instruction can be an inputted or generated instruction when users need the power grid to have the inertial requirements of a traditional power grid.

In the embodiment, a virtual synchronous machine is adopted for control. Traditional droop control is a preliminary simulation of the external characteristics of synchronous generators; in order to further simulate the inertia and damping characteristics of synchronous generators, a virtual synchronous generator VSG (Virtual Synchronous Generator) introduces a moment of inertia and a damping coefficient on the basis of the droop control, and thus the ability of suppressing interference and fluctuations is enhanced.

Figure 4:
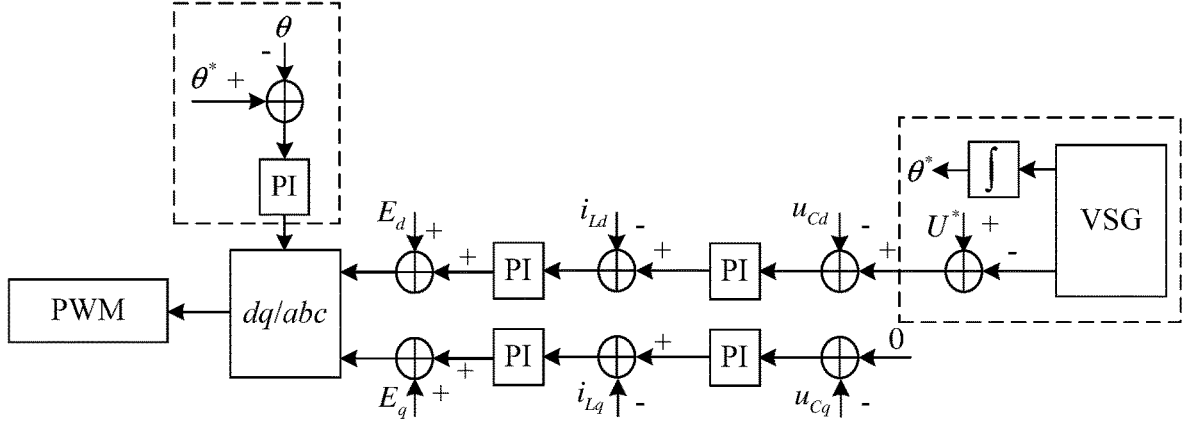
FIG. 4 is a schematic view of the control of an operation according to angle information and a compensation voltage value output by a virtual synchronous generator according to an embodiment of the present disclosure.

By proposing a strategy of collaborative self-adaptive control of the moment of inertia and the damping coefficient, as shown by the dotted section in FIG. 4, the change rate and the offset of the frequency are effectively suppressed.

In one of the embodiments, limiting the energy storage converter to operate according to the angle information and the compensation voltage value output by a virtual synchronous generator comprises: determining an angle instruction value according to the angle information; obtaining the first current value on the power grid and the first voltage value of the capacitor on the power grid; determining the first angle value according to the first voltage value; determining the second voltage value, the third voltage value, the second current value and the third current value according to the first voltage value and the first current value; receiving the given voltage value of the capacitor on the power grid; inputting the compensation voltage value, the given voltage value, the second voltage value and the third voltage value into the proportional integral controller to render a fifth output result; inputting the fifth output result, the second current value and the third current value into the proportional integral controller to render a sixth output result; inputting the angle instruction value and the first angle value into the proportional integral controller to render a seventh output result; and determining a third pulse width modulation signal according to the sixth output result, the feedback voltage of the power grid and the seventh output result, and limiting the energy storage converter to operate according to the third pulse width modulation signal.

In the embodiment, as shown in FIG. 4, firstly, through the virtual synchronous machine strategy VSG, an angular velocity (i.e., the angle information in the present disclosure) and a voltage (i.e., the compensation voltage value in the present disclosure) are generated, the angular velocity is subjected to integral calculation to obtain an angle instruction value $\theta^*$, and meanwhile, the virtual synchronous machine strategy VSG will further generate a feed forward compensation voltage. Then, based on an instruction value [U*, 0] of a capacitor voltage, the feed forward compensation voltage (i.e., the compensation voltage value in the present disclosure) is compared with $u_{Cd}$ and $u_{Cq}$, and through the proportional integral controller, a fifth output result is rendered, i.e., $$i_{Ld}^* \text{ and } i_{Lq}^*,$$

and through the proportional integral controller of the current measurement values $i_{Ld}$ and $i_{Lq}$, the instruction value (i.e., the sixth output result in the present disclosure) of the voltage of the power grid is rendered, and then compared with the feedback value (i.e., the feedback voltage of the power grid in the present disclosure) of the voltage of the power grid, then a direct-current component is transformed into a three-phase alternating-current volume through the dq-abc conversion, a pulse signal (i.e., the third pulse width modulation signal in the present disclosure) is generated using a pulse width modulation signal generator, and a semiconductor in the major loop is driven through a driver. Being different from that the PLL directly generates a frequency signal, the instruction value $\theta^*$ (i.e., the angle instruction value of the present disclosure) of the angle needs to be provided herein, then is compared with a measurement value $\theta$ (i.e., the first angle value of the present disclosure), and then an angle signal (i.e., the seventh output result in the present disclosure) is generated through the proportional integral controller.

In one of the embodiments, in the case that an electrical signal transmitted by the power grid is received, it is determined that the power grid operates in the normal state; in the case that the electrical signal transmitted by the power grid is not received, it is determined that the power grid operates in the abnormal state.

Figure 5:
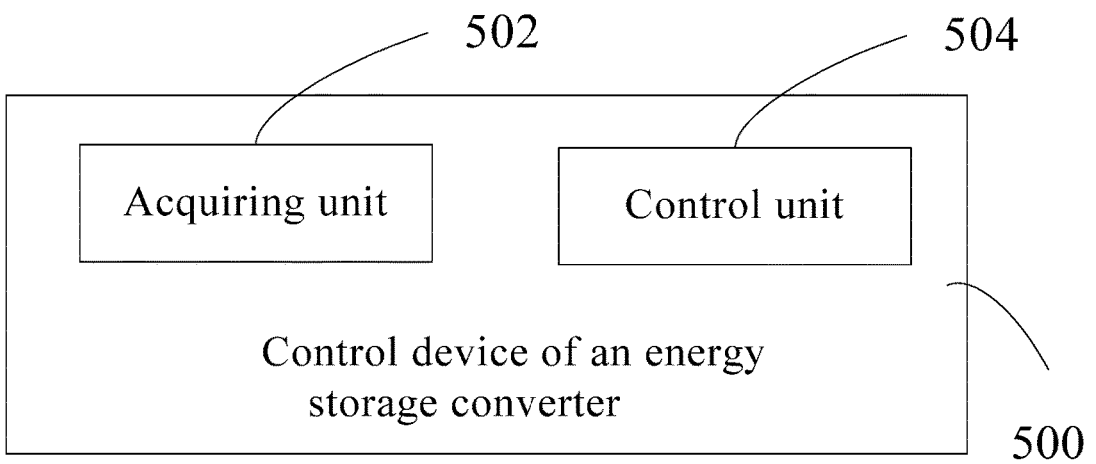
FIG. 5 is a first schematic block diagram of a control device of an energy storage converter according to an embodiment of the present disclosure.

In one of the embodiments, as shown in FIG. 5, the present disclosure provides a control device 500 of an energy storage converter, the energy storage converter is connected to a power grid, and the control device comprises: an acquiring unit 502, used for obtaining the operation state of the power grid; a control unit 504, used for limiting the energy storage converter to operate in a grid-connected mode in the case that the power grid operates in a normal state; in the case that the power grid operates in an abnormal state, the energy storage converter is limited to operate in an island mode, wherein in the grid-connected mode, the energy storage converter uses active power and reactive power decoupling control, and in the island mode, the energy storage converter uses virtual magnetic flux control.

The embodiment of the present disclosure provides the control device 500 of an energy storage converter, the energy storage converter which uses the control device obtains the operation state of the power grid and is limited to enter different control modes according to the operation state of the power grid; in the grid-connected mode, decoupling control is conducted according to the active power and the reactive power, so as to maintain a balance between the active power and the reactive power according to the scheduling instruction of the upper level, and provide qualified electrical energy to the power grid. In the island mode, the virtual magnetic flux control is adopted, so as to quickly establish voltage and frequency support for the local, and supply reliable electrical energy quality for important loads and sensitive loads.

In the above embodiment, the control unit 504 is specifically used for: obtaining a first current value on the power grid and a first voltage value of a capacitor on the power grid; determining a first angle value according to the first voltage value; determining a second voltage value, a third voltage value, a second current value and a third current value according to the first voltage value and the first current value; receiving an active power instruction value and a reactive power instruction value; determining a first instruction current value and a second instruction current value according to the active power instruction value, the reactive power instruction value, the second voltage value and the third voltage value; inputting the second current value, the third current value, the first instruction current value and the second instruction current value into a proportional integral controller, to render a first output result; and determining a first pulse width modulation signal according to the first output result, a feedback voltage of the power grid and the first angle value, and limiting the energy storage converter to operate according to the first pulse width modulation signal.

In the embodiment, in the grid-connected mode, the power grid can maintain the stability of the voltage and the frequency, and therefore, after the active power instruction value and the reactive power instruction value are received, it is only necessary to control the output current of an inverter in the energy storage converter and then the control of power is achieved, and it is understandable that the active power and reactive power decoupling control is a current source control.

Specifically, the active power and reactive power decoupling control will receive an active power instruction value P*, a reactive power instruction value Q*, a current instruction is calculated by the combination of formula (1) and formula (2), so that a current closed-loop control is achieved, i.e., the active power and reactive power decoupling control in the above text, i.e., P/Q power decoupling control.

$$i_{Ld}^* = \frac{2(P*u_d - Q*u_q)}{3(u_{Cd}^2 + u_{Cq}^2)}; \tag{1}$$

$$i_{Lq}^* = \frac{(2(P*u_q + Q*u_d)}{3(u_{Cd}^2 + u_{Cq}^2)}; \tag{2}$$

Wherein, $u_d$, $u_q$ are grid-side voltages, i.e., the feedback voltages of the power grid, $$i_{Ld}^* \text{ and } i_{Lq}^*$$

are instruction currents.

Specifically, as shown in FIG. 2, above the dot dash line is a power portion, which is the major loop circuit of a converter, and is constituted by a direct-current battery, a semiconductor topology circuit, a filter L and C, and an equivalent reactance LG of the power grid. Below the dot dash line is a control portion, firstly, a capacitor voltage $u_c$ (i.e., the first voltage value in the present disclosure) and a current $i_L$ (i.e., the first current value in the present disclosure) are measured by a voltage sensor and a current sensor, and then converted into an angle θ (i.e., the first angle value of the present disclosure) by a PLL module, and the voltage $u_c$ and the current $i_L$ are converted into $u_{Cdq}$ and $i_{Ldq}$ based on abc-dq transformation, wherein, the $u_{Cdq}$ comprises two portions, i.e., $u_{Cd}$ and $u_{Cq}$, and the $i_{Lq}$ comprises the portions of $i_{Ld}$ and $i_{Lq}$ (i.e., $u_{Cd}$ is the second voltage value in the present disclosure, $u_{Cq}$ is the third voltage value in the present disclosure, $i_{Ld}$ is the second current value and $i_{Lq}$ is the third current value in the present disclosure). Then, according to the above formulas (1) and (2), the active power instruction value P*, the reactive power instruction value Q* and the $u_{Cdq}$ are known, and then $$i_{Ld}^* \text{ and } i_{Lq}^*$$

(i.e., the first instruction current value and the second instruction current value in the present disclosure) can be calculated, an instruction value (i.e., the first output result in the present disclosure) of the voltage of the power grid is rendered through the proportional integral controller of the current measurement values $i_{Ld}$ and $i_{Lq}$, and then compared with the feedback value (i.e., the feedback voltage of the power grid in the present disclosure) of the voltage of the power grid, then a direct-current component is transformed into a three-phase alternating-current volume through the dq-abc conversion, a pulse signal (i.e., the first pulse width modulation signal in the present disclosure) is generated using a pulse width modulation signal generator, and a semiconductor in a major loop is driven through a driver.

In the above embodiment, the control unit 504 is specifically used for: obtaining the first current value on the power grid and the first voltage value of the capacitor on the power grid; determining the first angle value according to the first voltage value; determining the second voltage value, the third voltage value, the second current value and the third current value according to the first voltage value and the first current value; receiving a given voltage value of the capacitor on the power grid; inputting the given voltage value, the second voltage value and the third voltage value into the proportional integral controller to render a second output result; inputting the second output result, the second current value and the third current value into the proportional integral controller to render a third output result; receiving a given angle value and inputting the given angle value and the first angle value into the proportional integral controller to render a fourth output result; and determining a second pulse width modulation signal according to the third output result, the feedback voltage of the power grid and the fourth output result, and limiting the energy storage converter to operate according to the second pulse width modulation signal.

In the embodiment, the virtual magnetic flux control is a voltage source control that simulates the magnetic flux of a motor, and its core is to control the amplitude and frequency of the voltage, quickly establish a voltage and frequency support for the local in an accurate power mode, and provide reliable electrical energy quality to important loads and sensitive loads. This control adopts a typical double closed loop control structure of a voltage outer loop and a current inner loop, wherein a voltage outer loop controller achieves that the inverter outputs the voltage stably; in addition, a frequency outer loop controller is added to stabilize the output frequency, and therefore, the stability of the frequency output by the energy storage converter is enhanced. Specifically, the added frequency outer loop controller is used for stabilizing the output frequency, as shown by the dotted section in FIG. 3.

In the virtual magnetic flux control, firstly, the capacitor voltage $u_c$ (i.e., the first voltage value in the present disclosure) and the current $i_L$ (i.e., the first current value in the present disclosure) are measured by the voltage sensor and the current sensor, and then converted into an angle $\theta$ (i.e., the first angle value of the present disclosure) by the PLL module, and the voltage $u_c$ and the current $i_L$ are converted into $u_{Cdq}$ and $i_{Ldq}$ based on abc-dq transformation, wherein, the $u_{Cdq}$ comprises two portions, i.e., $u_{Cd}$ and $u_{Cq}$, and the $i_{Lq}$ comprises the portions of $i_{Ld}$ and $i_{Lq}$ (i.e., $u_{Cd}$ is the second voltage value in the present disclosure, $u_{Cq}$ is the third voltage value in the present disclosure, $i_{Ld}$ is the second current value and $i_{Lq}$ is the third current value in the present disclosure). Then, based on an instruction value [U*, 0] (i.e. the given voltage value in the present disclosure) of a capacitor voltage, they are compared with $u_{Cd}$ and $u_{Cq}$, a second output result is rendered through the proportional integral controller, i.e., $$i^*_{Ld} \text{ and } i^*_{Lq},$$

and the second output result, the $i_{Ld}$ and $i_{Lq}$ are input into the proportional integral controller, to render a third output result and then, the instruction value of the voltage of the power grid is rendered, and then compared with the feedback value (i.e., the feedback voltage of the power grid in the present disclosure) of the voltage of the power grid, then a direct-current component is transformed into a three-phase alternating-current volume through the dq-abc conversion, a pulse signal (i.e., the second pulse width modulation signal in the present disclosure) is generated using a pulse width modulation signal generator, and a semiconductor in a major loop is driven through a driver. Being different from that the PLL directly generates a frequency signal, the instruction value $\theta^*$ (i.e., the given angle value of the present disclosure) of the angle needs to be provided herein, then is compared with a measurement value $\theta$ (i.e., the first angle value of the present disclosure), and then an angle signal (i.e., the fourth output result in the present disclosure) is generated through the proportional integral controller.

In the above embodiment, the control unit 504 is also used for: in response to the first instruction, limiting the energy storage converter to operate according to the angle information and the compensation voltage value output by a virtual synchronous generator.

In the embodiment, the first instruction can be an inputted or generated instruction when users need the power grid to have the inertial requirements of a traditional power grid.

In the embodiment, a virtual synchronous machine is adopted for control. Traditional droop control is a preliminary simulation of the external characteristics of synchronous generators; in order to further simulate the inertia and damping characteristics of synchronous generators, a virtual synchronous generator VSG (Virtual Synchronous Generator) introduces a moment of inertia and a damping coefficient on the basis of the droop control, and thus the ability of suppressing interference and fluctuations is enhanced.

By proposing a strategy of collaborative self-adaptive control of the moment of inertia and the damping coefficient, as shown by the dotted section in FIG. 4, the change rate and the offset of the frequency are effectively suppressed.

In one of the embodiment, the control unit 504 is specifically used for: determining the angle instruction value according to the angle information; obtaining the first current value on the power grid and the first voltage value of the capacitor on the power grid; determining the first angle value according to the first voltage value; determining the second voltage value, the third voltage value, the second current value and the third current value according to the first voltage value and the first current value; receiving the given voltage value of the capacitor on the power grid; inputting the compensation voltage value, the given voltage value, the second voltage value and the third voltage value into the proportional integral controller to render the fifth output result; inputting the fifth output result, the second current value and the third current value into the proportional integral controller to render the sixth output result; inputting the angle instruction value and the first angle value into the proportional integral controller to render a seventh output result; and determining the third pulse width modulation signal according to the sixth output result, the feedback voltage of the power grid and the seventh output result, and limiting the energy storage converter to operate according to the third pulse width modulation signal.

In the embodiment, firstly, through the virtual synchronous machine strategy VSG, an angular velocity (i.e., the angle information in the present disclosure) and a voltage (i.e., the compensation voltage value in the present disclosure) are generated, the angular velocity is subjected to integral calculation to obtain an angle instruction value $\theta^*$, and meanwhile, the virtual synchronous machine strategy VSG will further generate a feed forward compensation voltage. Then, based on an instruction value [U*, 0] of the capacitor voltage, the feed forward compensation voltage (i.e., the compensation voltage value in the present disclosure) is compared with $u_{Cd}$ and $u_{Cq}$, and through the proportional integral controller, a fifth output result is rendered, i.e., $$i_{Ld}^* \text{ and } i_{Lq}^*,$$

and through the proportional integral controller of the current measurement values $i_{Ld}$ and $i_{Lq}$, the instruction value (i.e., the sixth output result in the present disclosure) of the voltage of the power grid is rendered, and then compared with the feedback value (i.e., the feedback voltage of the power grid in the present disclosure) of the voltage of the power grid, then a direct-current component is transformed into a three-phase alternating-current volume through the dq-abc conversion, a pulse signal (i.e., the third pulse width modulation signal in the present disclosure) is generated using a pulse width modulation signal generator, and a semiconductor in the major loop is driven through a driver. Being different from that the PLL directly generates a frequency signal, the instruction value θ* (i.e., the angle instruction value of the present disclosure) of the angle needs to be provided herein, then is compared with a measurement value θ (i.e., the first angle value of the present disclosure), and then an angle signal (i.e., the seventh output result in the present disclosure) is generated through the proportional integral controller.

In one of the embodiments, the control unit 504 is specifically used for: in the case that the electrical signal transmitted by the power grid is received, determining that the power grid operates in the normal state; in the case that the electrical signal transmitted by the power grid is not received, determining that the power grid operates in the abnormal state.

Figure 6:
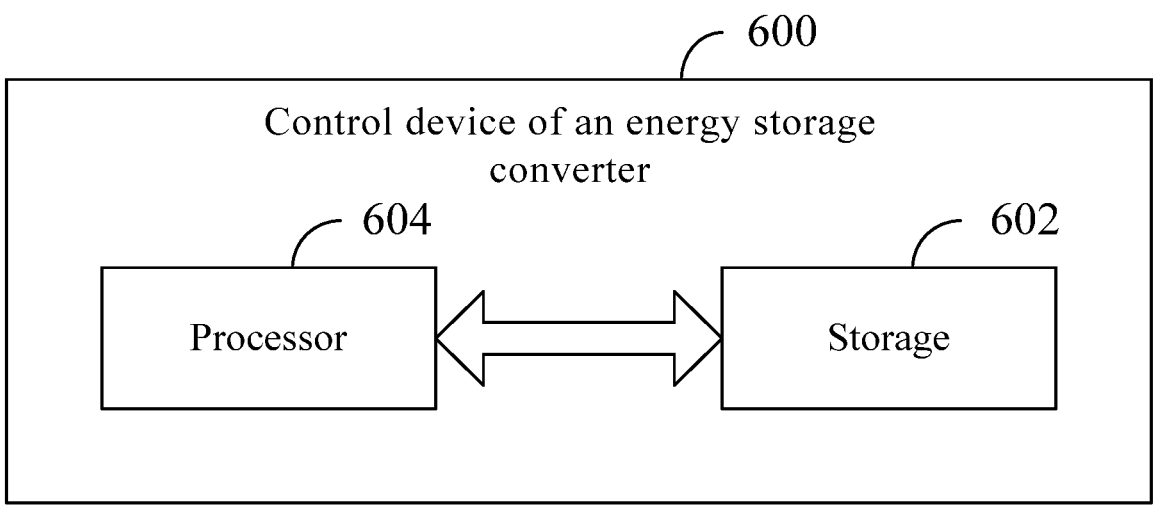
FIG. 6 is a second schematic block diagram of a control device of an energy storage converter according to an embodiment of the present disclosure.

In any of the embodiments, as shown in FIG. 6, the present disclosure provides a control device 600 of an energy storage converter, the energy storage converter is connected to a power grid, and the control device comprises a storage 602 and a processor 604, a program is stored in the storage 602, when the processor 604 executes the program, the steps of the control method for an energy storage converter of any of the above solutions are achieved.

The embodiment of the present disclosure provides a control device 600 of an energy storage converter, in the control device 600 of an energy storage converter, the processor 604 can achieve the steps of the control method for the above energy storage converter when operating according to the programs or instructions stored in the storage 602, and thus the control device 600 of an energy storage converter has all the beneficial effects of the above control method for an energy storage converter, which are not repeated herein.

In one of the embodiments, the present disclosure provides a computer readable storage medium, on which a program or an instruction is stored, when the program or the instruction is executed by a processor, the steps of the control method for an energy storage converter of any of the above solutions are achieved.

The embodiment of the present disclosure provides a computer readable storage medium, the computer readable storage medium can achieve the steps of the above control method for an energy storage converter, and thus has all the beneficial effects of the above control method for an energy storage converter, which are not repeated herein.

In one of the embodiments, the present disclosure provides an energy storage converter, comprising: the control device of an energy storage converter according to any of the above solutions; or the above computer readable storage medium.

In one of the embodiments, the energy storage converter can be a bidirectional energy storage converter.

Figure 7:
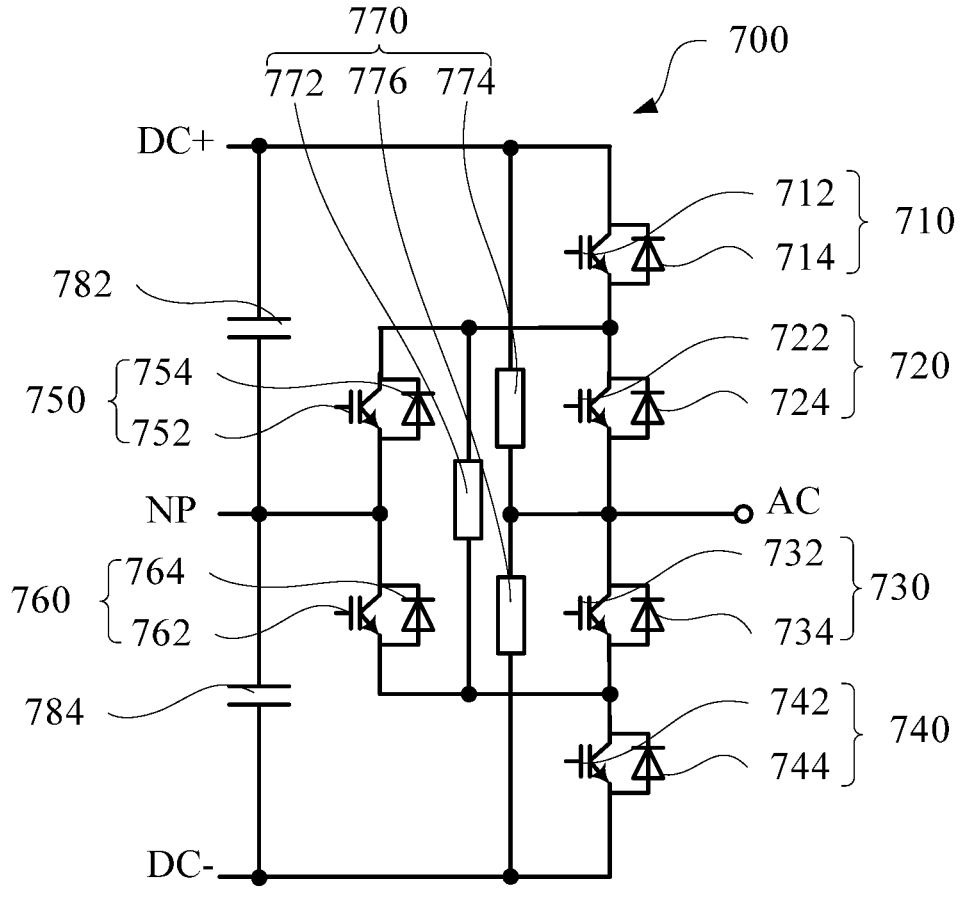
FIG. 7 is a first schematic view of the structure of a bridge arm in an energy storage converter according to an embodiment of the present disclosure.
Figure 8:
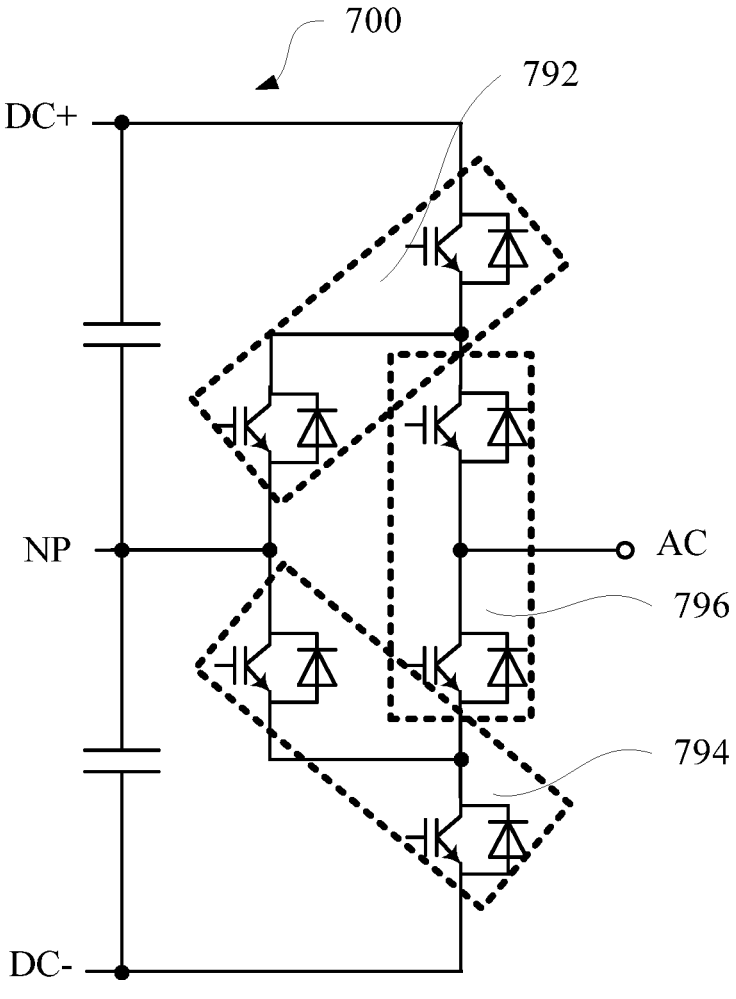
FIG. 8 is a second schematic view of the structure of a bridge arm in an energy storage converter according to an embodiment of the present disclosure.

As shown in FIG. 7, the present embodiment provides a bidirectional energy storage converter, comprising: at least one bridge arm 700, wherein each bridge arm 700 comprises: a first switch assembly 710, a second switch assembly 720, a third switch assembly 730, a fourth switch assembly 740, a fifth switch assembly 750, a sixth switch assembly 760 and a resistor assembly 770. Wherein, a first end of the first switch assembly 710 is connected to a positive electrode DC+ of a direct-current busbar; a first end of the second switch assembly 720 is connected to a second end of the first switch assembly 710; a first end of the third switch assembly 730 is connected to a second end of the second switch assembly 720, and the first end of the third switch assembly 730 is connected to an alternating-current busbar AC; a first end of the fourth switch assembly 740 is connected to a second end of the third switch assembly 730, and a second end of the fourth switch assembly 740 is connected to a negative electrode DC− of the direct-current busbar; a first end of the fifth switch assembly 750 is connected to the first end of the second switch assembly 720, and a second end of the fifth switch assembly 750 is connected to a 0 electrode, i.e., NP, of the direct-current busbar; a first end of the sixth switch assembly 760 is connected to the second end of the fifth switch assembly 750, and a second end of the sixth switch assembly 760 is connected to the first end of the fourth switch assembly 740; a first end of the resistor assembly 770 is connected to the first end of the fifth switch assembly 750, a second end of the resistor assembly 770 is connected to the second end of the sixth switch assembly 760, a third end of the resistor assembly 770 is connected to the first end of the first switch assembly 710, and a fourth end of the resistor assembly 770 is connected to the second end of the fourth switch assembly 740. Wherein, each of the first switch assembly 710, the second switch assembly 720, the third switch assembly 730, the fourth switch assembly 740, the fifth switch assembly 750 and the sixth switch assembly 760 comprises one switch tube and one diode.

The present disclosure defines an energy storage converter, such as a bidirectional energy storage converter, the bidirectional energy storage converter comprises at least one bridge arm 700, and each bridge arm 700 comprises six switch assemblies, wherein, each switch assembly comprises one switch tube and one diode, and the switch tube and the diode of each switch assembly are connected in parallel. The first end of the first switch assembly 710 and the second end of the fourth switch assembly 740 are respectively connected to the positive electrode of the direct-current busbar and the negative electrode of the direct-current busbar, and the second switch assembly 720 and the third switch assembly 730 are connected between the first switch assembly 710 and the fourth switch assembly 740. Wherein, the first end of the second switch assembly 720 is connected to the second end of the first switch assembly 710, the first end of the third switch assembly 730 is connected to the second end of the second switch assembly 720, the second end of the third switch assembly 730 is connected to the first end of the fourth switch assembly 740, and a common end of the second switch assembly 720 and the third switch assembly 730 is connected to the alternating-current busbar. A common end of the first switch assembly 710 and the second switch assembly 720 is connected to the first end of the fifth switch assembly 750, a common end of the third switch assembly 730 and the fourth switch assembly 740 is connected to the second end of the sixth switch assembly 760, the second end of the fifth switch assembly 750 is connected to the first end of the sixth switch assembly 760, and a common end of the fifth switch assembly 750 and the sixth switch assembly 760 is connected to the 0 electrode of the direct-current busbar.

It is worthy of explanation that when the bidirectional energy storage converter comprises multiple bridge arms 700, the common end of the fifth switch assembly 750 and the sixth switch assembly 760 of each of the multiple bridge arms 700 is connected to the 0 electrode of the direct-current busbar, the first switch assembly 710 and the fourth switch assembly 740 are respectively connected to the positive electrode and the negative electrode of the direct-current busbar, and the common end of the second switch assembly 720 and the third switch assembly 730 is connected to the alternating-current busbar as an alternating-current connecting end.

In some embodiments, the bidirectional energy storage converter comprises three bridge arms 700, and the alternating-current connecting ends of the three bridge arms 700 are respectively connected to an A phase, a B phase and a C phase of the alternating-current busbar.

In the prior art, for two clamping diodes, when the bidirectional energy storage converter operates in a working condition of a low modulation ratio, the junction temperature of the clamping diodes is especially high, this renders the unbalanced temperature of the semiconductor in the bidirectional energy storage converter. If it needs to continue operating in the working condition of a low modulation ratio, the bidirectional energy storage converter needs to reduce capacity to be used.

The present embodiment replaces the two clamping diodes in the bidirectional energy storage converter with the fifth switch assembly 750 and the sixth switch assembly 760, as both of the fifth switch assembly 750 and the sixth switch assembly 760 comprise the diode and the switch tube connected in parallel, the effect of shunting the currents flowing through the fifth switch assembly 750 and the sixth switch assembly 760 is achieved, and the values of the currents flowing through the fifth switch assembly 750 and the sixth switch assembly 760 are made low, and thereby this avoids the problem in the related art that the junction temperature of the clamping diode is high.

Each bridge arm 700 in the bidirectional energy storage converter is provided with the resistor assembly 770, and the resistor assembly 770 comprises four connecting ends, wherein, the first end, the second end, the third end and the fourth end are respectively connected to the fifth switch assembly 750, the sixth switch assembly 760, the first switch assembly 710 and the fourth switch assembly 740. The resistor assembly 770 can conduct voltage balance to the fifth switch assembly 750 and the sixth switch assembly 760 for clamping, so that the voltage of the fifth switch assembly 750 and the sixth switch assembly 760 for clamping is more balanced, and the resistor assembly can also conduct voltage balance to the first switch assembly 710, the second switch assembly 720, the third switch assembly 730 and the fourth switch assembly 740 in a major loop in the bidirectional energy storage converter, so that the voltage between the switch assemblies in the major loop of the bidirectional energy storage converter is more balanced.

In some embodiments, the switch tube is a controllable switch device, and the switch tube is limited to be periodically on or off in the case that the bidirectional energy storage converter conducts high voltage charging or high voltage discharging.

In these embodiments, when the bidirectional energy storage converter conducts high voltage charging or high voltage discharging, as the switch tube and the diode in the switch assemblies are connected in parallel, the switch tube is limited to start, the currents flowing through the diodes in the switch assemblies are shunted, and then the current flowing through the resistor is reduced. The currents flowing through the diodes can be shunted periodically through limiting the switch tube to be periodically on or off, so that the diodes have enough time to dissipate heat, and this avoids the problem that the temperature of the diodes in the switch assemblies rise too quickly.

In some other embodiments, the switch tube is a controllable switch device, in the case that the bidirectional energy storage converter conducts high voltage charging or high voltage discharging, the switch tube is limited to continuously keep an on state.

In these embodiments, when the bidirectional energy storage converter conducts high voltage charging or high voltage discharging, as the switch tube and the diode in the switch assemblies are connected in parallel, the switch tube is limited to start, the currents flowing through the diodes in the switch assemblies are shunted, and then the current flowing through the resistor is reduced. The currents flowing through the diodes can be shunted continuously through limiting the switch tube to continuously keep on, and this avoids the problem that the temperature of the diodes in the switch assemblies rise too quickly.

It can be understood that the first switch assembly 710, the second switch assembly 720, the third switch assembly 730, the fourth switch assembly 740, the fifth switch assembly 750 and the sixth switch assembly 760 can be configured to be the same hardware structure, and this simplifies the structure in the bidirectional energy storage converter and lowers the production cost of the bidirectional energy storage converter.

The bidirectional energy storage converter can limit the charging and discharging processes of a battery, conduct the converting between an alternating-current and a direct-current, and can directly supply power to an alternating-current load in the case that there is not any power grid.

As shown in FIG. 7, in the above embodiment, the first switch assembly 710 comprises a first switch tube 712 and a first diode 714. A first end of the first switch tube 712 is connected to the positive electrode DC+ of the direct-current busbar; a positive electrode of the first diode 714 is connected to a second end of the first switch tube 712, and a negative electrode of the first diode 714 is connected to the first end of the first switch tube 712; the second switch assembly 720 comprises a second switch tube 722 and a second diode 724. A first end of the second switch tube 722 is connected to the second end of the first switch tube 712; a positive electrode of the second diode 724 is connected to a second end of the second switch tube 722, and a negative electrode of the second diode 724 is connected to the first end of the second switch tube 722; the third switch assembly 730 comprises a third switch tube 732 and a third diode 734. A first end of the third switch tube 732 is connected to the second end of the second switch tube 722, and the first end of the third switch tube 732 is connected to the alternating-current busbar; a positive electrode of the third diode 734 is connected to a second end of the third switch tube 732, and a negative electrode of the third diode 734 is connected to the first end of the third switch tube 732; the fourth switch assembly 740 comprises a fourth switch tube 742 and a fourth diode 744. A first end of the fourth switch tube 742 is connected to the second end of the third switch tube 732, and a second end of the fourth switch tube 742 is connected to the negative electrode of the direct-current busbar; a positive electrode of the fourth diode 744 is connected to a second end of the fourth switch tube 742, and a negative electrode of the fourth diode 744 is connected to the first end of the fourth switch tube 742; the fifth switch assembly 750 comprises a fifth switch tube 752 and a fifth diode 754. A first end of the fifth switch tube 752 is connected to the first end of the second switch tube 722, and a second end of the fifth switch tube 752 is connected to the 0 electrode of the direct-current busbar; a positive electrode of the fifth diode 754 is connected to a second end of the fifth switch tube 752, and a negative electrode of the fifth diode 754 is connected to the first end of the fifth switch tube 752; and the sixth switch assembly 760 comprises a sixth switch tube 762 and a sixth diode 764. A first end of the sixth switch tube 762 is connected to the second end of the fifth switch tube 752, and a second end of the sixth switch tube 762 is connected to the first end of the fourth switch tube 742; a positive electrode of the sixth diode 764 is connected to a second end of the sixth switch tube 762, and a negative electrode of the sixth diode 764 is connected to the first end of the sixth switch tube 762.

In the embodiment, each of the first switch assembly 710, the second switch assembly 720, the third switch assembly 730, the fourth switch assembly 740, the fifth switch assembly 750 and the sixth switch assembly 760 is provided with the diode and the switch tube. Wherein, the first switch tube 712, the second switch tube 722, the third switch tube 732 and the fourth switch tube 742 are connected end to end, and the first end of the first switch tube 712 is connected to the positive electrode of the direct-current busbar, and the second end of the fourth switch tube 742 is connected to the negative electrode of the direct-current busbar. The first end of the fifth switch tube 752 is connected to the common end of the first switch tube 712 and the second switch tube 722, the second end of the sixth switch tube 762 is connected to the common end of the third switch tube 732 and the fourth switch tube 742, the common end of the fifth switch tube 752 and the sixth switch tube 762 is connected to the 0 electrode of the direct-current busbar, and the common end of the second switch tube 722 and the third switch tube 732 is connected to the alternating-current busbar. The first switch tube 712, the second switch tube 722, the third switch tube 732, the fourth switch tube 742, the fifth switch tube 752 and the sixth switch tube 762 are respectively connected to the first diode 714, the second diode 724, the third diode 734, the fourth diode 744, the fifth diode 754 and the sixth diode 764 in parallel.

Wherein, the fifth diode 754 and the sixth diode 764 are the clamping diodes of the bidirectional energy storage converter, through connecting the fifth switch tube 752 and the sixth switch tube 762 with the fifth diode 754 and the sixth diode 764 in parallel, this avoids the problem that the fifth diode 754 and the sixth diode 764 heat quickly in the case that the bidirectional energy storage converter conducts high voltage charging and high voltage discharging.

It is worthy of explanation that the direct-current busbar uses a compact stacked busbar technology of an ultra low stray inductance. Distributed inductance can be lowered effectively.

As shown in FIG. 7, in any of the above embodiments, the resistor assembly 770 further comprises a first resistor 772, a second resistor 774 and a third resistor 776. Wherein, a first end of the first resistor 772 is connected to the first end of the fifth switch assembly 750, and a second end of the first resistor 772 is connected to the second end of the sixth switch assembly 760; a first end of the second resistor 774 is connected to the first end of the first switch assembly 710; a first end of the third resistor 776 is connected to a second end of the second resistor 774, and a second end of the third resistor 776 is connected to the second end of the fourth switch assembly 740.

In the embodiment, the resistor assembly 770 comprises the first resistor 772, the second resistor 774 and the third resistor 776.

The two ends of the first resistor 772 are respectively connected to the first end of the fifth switch assembly 750 and the second end of the sixth switch assembly 760, that is, the two ends of the first resistor 772 are respectively connected to the two switch assemblies for clamping. Through connecting the two switch assemblies for clamping with the first resistor 772, this can ensure that the voltage of the two switch assemblies for clamping is more balanced during the operation of the bidirectional energy storage converter.

The second resistor 774 is in series connection with the third resistor 776, the second resistor 774 is also connected to the first end of the first switch assembly 710, and the third resistor 776 is also connected to the fourth switch assembly 740. Through arranging the second resistor 774 and the third resistor 776 which are in series connection on the major loop of the bidirectional energy storage converter, this achieves the function of balancing the voltage of the first switch assembly 710, the second switch assembly 720, the third switch assembly 730 and the fourth switch assembly 740 on the major loop through the second resistor 774 and the third resistor 776, and can ensure that the voltages of the four switch assemblies on the major loop are more balanced during the operation of the bidirectional energy storage converter.

As shown in FIG. 7, in any of the above embodiments, each bridge arm 700 comprises a first capacitor 782, a second capacitor 784.

Wherein, a first end of the first capacitor 782 is connected to the positive electrode of the direct-current busbar; a first end of the second capacitor 784 is connected to a second end of the first capacitor 782 and the 0 electrode of the direct-current busbar, and a second end of the second capacitor 784 is configured to connect with the negative electrode of the direct-current busbar.

In the embodiment, the first capacitor 782 is provided between the positive electrode of the direct-current busbar and the 0 electrode, and the second capacitor 784 is provided between the negative electrode of the direct-current busbar and 0 electrode. Through disposing the capacitors among the positive electrode, the 0 electrode and the negative electrode of the direct-current busbar, this can ensure the stability of a direct-current voltage.

Figure 9:
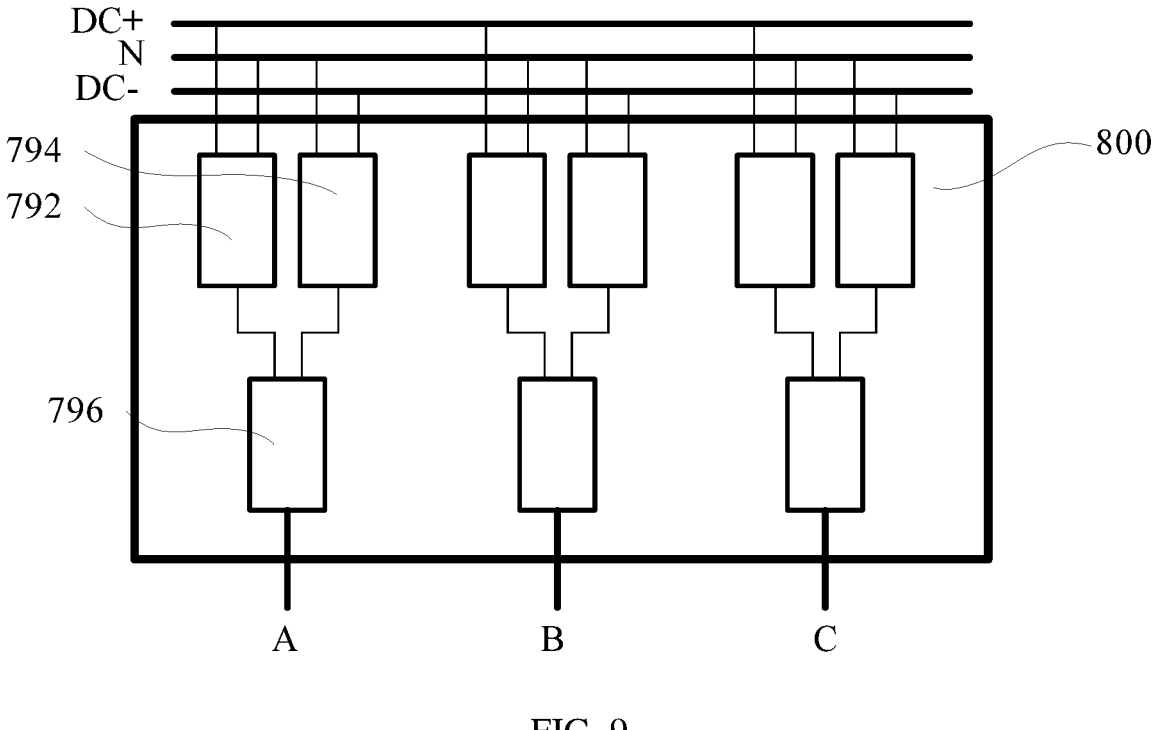
FIG. 9 is a first schematic view of the structure of an energy storage converter according to an embodiment of the present disclosure.
Figure 10:
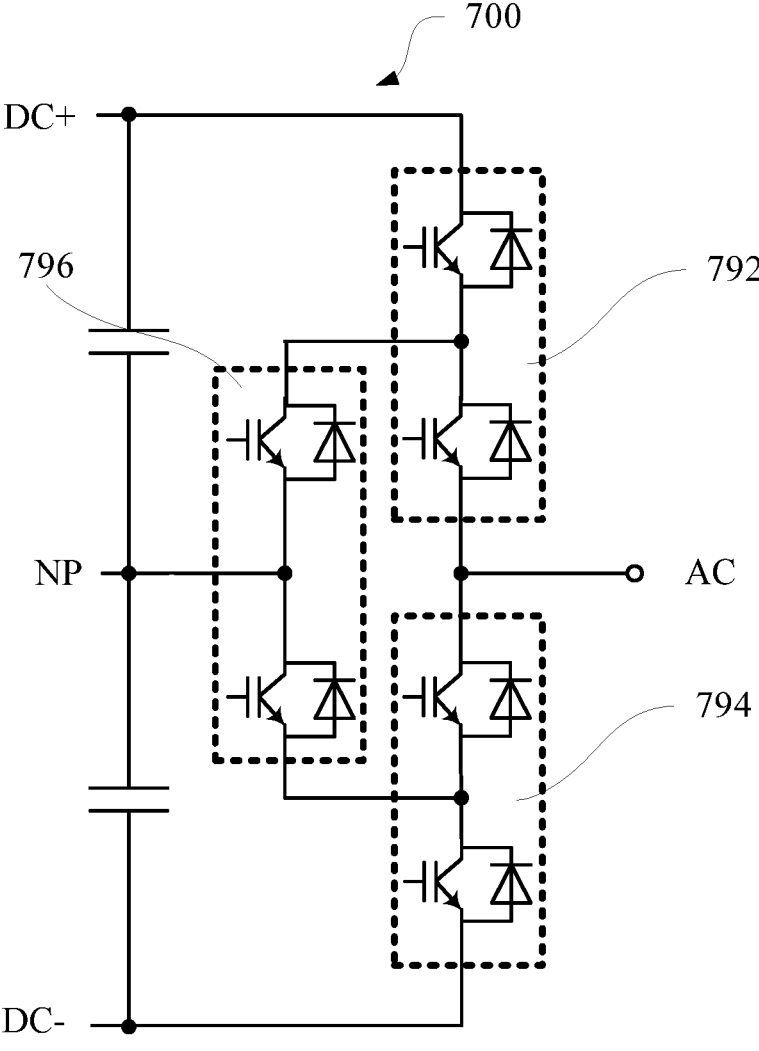
FIG. 10 is a third schematic view of the structure of a bridge arm in an energy storage converter according to an embodiment of the present disclosure.
Figure 11:
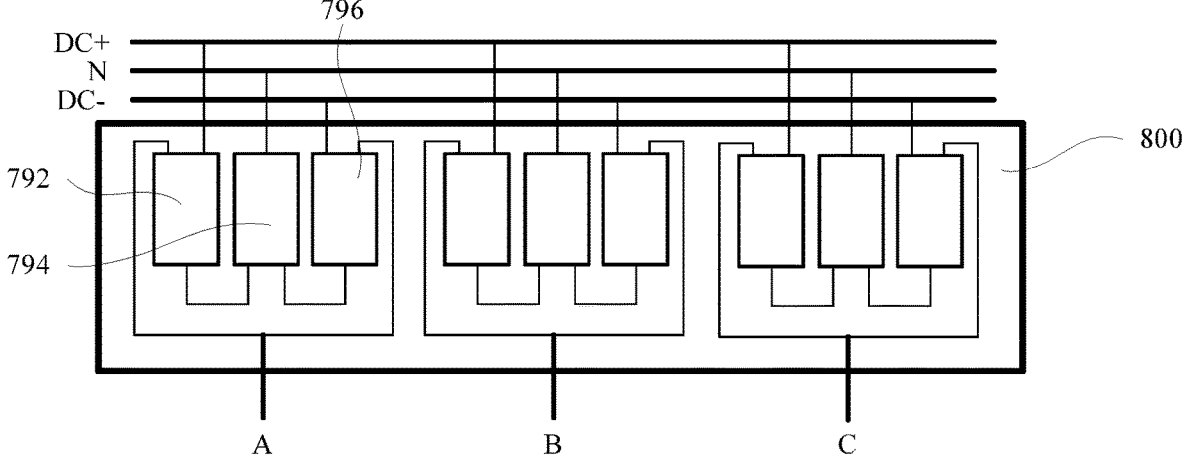
FIG. 11 is a second schematic view of the structure of an energy storage converter according to an embodiment of the present disclosure.

As shown in FIG. 7, FIG. 9 and FIG. 11, in any of the above embodiments, the bidirectional energy storage converter further comprises a heat sink 800. The heat sink 800 is disposed corresponding to at least one bridge arm 700.

In the embodiment, the bidirectional energy storage converter is further provided with the heat sink 800. The heat sink 800 is provided inside the bidirectional energy storage converter, and the heat sink 800 is disposed corresponding to the bridge arm 700 in the bidirectional energy storage converter. Heat dissipating can be conducted to electronic components in the bridge arm 700 of the bidirectional energy storage converter through the heat sink 800.

In some other embodiments, the bridge arm 700 is arranged attached to the heat sink 800.

In these embodiments, the heat sink 800 and the bridge arm 700 are arranged to contact each other, and thus the contact area between the electronic components on the bridge arm 700 and the heat sink 800 can be enhanced, and thus the heat dissipation effect of the heat sink 800 to the electronic components on the bridge arm 700 is improved.

In some other embodiments, the bridge arm 700 is disposed on the heat sink 800.

In these embodiments, through directly connecting the circuit structure on the bridge arm 700 of the bidirectional energy storage converter to the heat sink 800, specifically, connecting the circuit board of the circuit structure to the heat sink 800, the stability of the contact between the heat sink 800 and the bridge arm 700 can also be ensured in a precondition of improving the heat dissipating effect of the heat sink 800 to the circuit structure.

It is worthy of explanation that the heat sink 800 can be selected from one or the combination of a plate type heat exchanger and a heat dissipation fin. The heat sink 800 can also choose an air-cooled or water-cooled heat dissipation assembly.

As shown in FIG. 7, FIG. 8, FIG. 9, FIG. 10 and FIG. 11, in any of the above embodiments, the first switch assembly 710 and the fifth switch assembly 750 are a first module 792; the fourth switch assembly 740 and the sixth switch assembly 760 are a second module 794; the second switch assembly 720 and the third switch assembly 730 are a third module 796; wherein the first module 792, the second module 794 and the third module 796 are modules of the same model.

In the embodiment, the first switch assembly 710 and the fifth switch assembly 750 are integrated to be the first module 792; the fourth switch assembly 740 and the sixth switch assembly 760 are integrated to be the second module 794; the second switch assembly 720 and the third switch assembly 730 are integrated to be the third module 796. Through integrating two switch assemblies into one module, the controls occupied by the circuit structure in the bidirectional energy storage converter can be reduced. Since each of the first module 792, the second module 794 and the third module 796 is disposed with two switch assemblies, the first module 792, the second module 794 and the third module 796 can choose the modules of the same model, and this reduces the purchasing cost of the modules, and thereby reduces the production cost of the bidirectional energy storage converter.

It is worthy of explanation that the first switch assembly 710, the fifth switch assembly 750, the sixth switch assembly 760 and the fourth switch assembly 740 are all connected to a direct-current bus, and thus, the first switch assembly 710 and the fifth switch assembly 750 which are close to each other are integrated to be the first module 792, and the fourth switch assembly 740 and the sixth switch assembly 760 which are close to each other are integrated to be the second module 794, and thus, the current path between the direct-current bus and the first module 792 and the second module 794 can be reduced. The common end of the second switch assembly 720 and the third switch assembly 730 is connected to an alternating-current bus, and thus the second switch assembly 720 and the third switch assembly 730 which are close to each other are integrated to be the third module 796, and the current path between the alternating-current bus and the second module 794 can be reduced. Through the arrangement of integrating the first switch assembly 710, the second switch assembly 720, the third switch assembly 730, the fourth switch assembly 740, the fifth switch assembly 750 and the sixth switch assembly 760 in pairs, the present disclosure not only reduces the production cost of the bidirectional energy storage converter, but also can make the commutation path of the bidirectional energy storage converter minimum, and improve the excessively high temperature of electronic devices in bidirectional energy storage converter.

As shown in FIG. 7, FIG. 8, FIG. 9, FIG. 10 and FIG. 11, in any of the above embodiments, the first module 792 and the second module 794 are arranged successively along a first direction, and the first module 792 and the third module 796 are arranged successively along a second direction.

In the embodiment, the first module 792 and the second module 794 are distributed side by side on the heat sink 800, since both the first module 792 and the second module 794 are connected to the direct-current busbar, distributing the first module 792 and the second module 794 side by side on the heat sink 800 can render that the first module 792 and the second module 794 are relatively close to the direct-current busbar, and staggering the third module 796 from the first module 792 and the second module 794 can avoid that the lines between the first module 792 and the second module 794 and the third module 796 will intersect the lines between the first module 792 and the second module 794, the heat dissipating effect to the first module 792, the second module 794 and the third module 796 and to the lines among the modules is enhanced in a precondition of ensuring a relatively small current path among the first module 792, the second module 794 and the third module 796.

It is worthy of explanation that gaps are provided among the first module 792, the second module 794 and the third module 796, which further improve the heat dissipation effect among the first module 792, the second module 794 and the third module 796.

As shown in FIG. 7, FIG. 8, FIG. 9, FIG. 10 and FIG. 11, in any of the above embodiments, the first switch assembly 710 and the second switch assembly 720 are the first module 792, the third switch assembly 730 and the fourth switch assembly 740 are the second module 794, and the fifth switch assembly 750 and the sixth switch assembly 760 are the third module 796; wherein the first module 792, the second module 794 and the third module 796 are modules of the same model.

In the embodiment, the first switch assembly 710 and the second switch assembly 720 are integrated to be the first module 792; the third switch assembly 730 and the fourth switch assembly 740 are integrated to be the second module 794; the fifth switch assembly 750 and the sixth switch assembly 760 are integrated to be the third module 796. Through integrating two switch assemblies into one module, the controls occupied by the circuit structure in the bidirectional energy storage converter can be reduced. Since each of the first module 792, the second module 794 and the third module 796 is disposed with two switch assemblies, the first module 792, the second module 794 and the third module 796 can choose modules of the same model, and this reduces the purchasing cost of the modules, and thereby reduces the production cost of the bidirectional energy storage converter.

It is worthy of explanation that both the fifth switch assembly 750 and the sixth switch assembly 760 are switch assemblies for clamping in the bidirectional energy storage converter, the common end of the fifth switch assembly 750 and the sixth switch assembly 760 is connected to the 0 electrode of the direct-current busbar, and the fifth switch assembly 750 and the sixth switch assembly 760 are integrated to be the third module 796. The first switch assembly

710 and the second switch assembly 720 are connected to the positive electrode of the direct-current busbar, and the first switch assembly 710 and the second switch assembly 720 are integrated to be the first module 792. The third switch assembly 730 and the fourth switch assembly 740 are connected to the negative electrode of the direct-current busbar. The respective switch assemblies are integrated according to the above methods, so that each of the first module 792, the second module 794 and the third module 796 is connected to the direct-current busbar, and therefore, it can be ensured that the distance among the three modules is disposed relatively small on the basis that the lines of the three modules do not coincide each other, thereby reducing the space occupied by the electronic components on the bridge arm 700 in the bidirectional energy storage converter.

As shown in FIG. 7, FIG. 8, FIG. 9, FIG. 10 and FIG. 11, in any of the above embodiments, the first module 792, the second module 794 and the third module 796 are arranged successively along the extending direction of the heat sink 800.

In the embodiment, all of the first module 792, the second module 794 and the third module 796 are connected to the direct-current busbar, and both the second module 794 and the third module 796 are connected to the alternating-current busbar, and thus, the first module 792, the second module 794 and the third module 796 can be arranged side by side. Since the heat sink 800 is used for dissipating heat for the first module 792, the second module 794 and the third module 796, then the size of the heat sink 800 adapts to the size of the first module 792, the second module 794 and the third module 796, and then this not only can reduce the space occupied by the electronic components, but also can reduce the space occupied by the heat sink 800 corresponding to the electronic components.

The methodologies described herein may be implemented by various means depending upon applications according to particular features and/or examples. For example, such methodologies may be implemented in hardware, firmware, and/or combinations thereof, along with software. In a hardware implementation, for example, a processor may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other devices units designed to perform the functions described herein, and/or combinations thereof.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, or electrical signals transmitted through a wire.

In the specification of the present disclosure, the term of "multiple" indicates two or more, unless otherwise explicitly specified or defined; the orientation or position relations indicated by the terms of "upper", "lower" and the like are based on the orientation or position relations shown in the accompanying drawings, and they are just intended to conveniently describe the present application and simplify the description, and are not intended to indicate or imply that the devices or units as indicated should have specific orientations or should be configured or operated in specific orientations, and then should not be construed as limitations to the present application; the terms of "connected to", "assembling", "fixing" and the like should be understood in a broad sense, for example, the term "connected to" may be a fixed connection, and may also be a removable connection, or an integral connection; and the term may be a direct connection and may also be an indirect connection through an intermediate medium. A person of ordinary skills in the art could understand the specific meanings of the terms in the present disclosure according to specific situations.

In the description of the present specification, the descriptions of the phrases "one embodiment", "some embodiments" and "specific embodiments" and the like mean that the specific features, structures, materials or characteristics described in combination with the embodiment(s) or example(s) are included in at least one embodiment or example of the present disclosure. In the specification, the schematic representation of the above phrases does not necessarily refer to the same embodiment or example. Moreover, the particular features, structures, materials or characteristics described may be combined in a suitable manner in any one or more of the embodiments or examples.

The descriptions above are only preferred embodiments of the present disclosure, and are not configured to limit the present disclosure. For a person skilled in the art, the present disclosure may have various changes and variations. Any modifications, equivalent substitutions, improvements, etc. made within the spirit and principle of the present disclosure shall all be included in the protection scope of the present disclosure.

What is claimed is:

1. A control method for an energy storage converter, wherein the energy storage converter is connected to a power grid, the control method comprising:
   obtaining an operation state of the power grid;
   limiting the energy storage converter to operate in a grid-connected mode under the condition that the power grid operates in a normal state;
   limiting the energy storage converter to operate in an island mode under the condition that the power grid operates in an abnormal state,
   wherein in the grid-connected mode, the energy storage converter uses active power and reactive power decoupling control, and in the island mode, the energy storage converter uses virtual magnetic flux control; and
   in response to a first instruction, limiting the energy storage converter to operate according to an angle information and a compensation voltage value output by a virtual synchronous generator.

2. The control method for an energy storage converter according to claim 1, wherein the step of limiting the energy storage converter to operate in a grid-connected mode comprises:

obtaining a first current value on the power grid and a first voltage value of a capacitor on the power grid;

determining a first angle value according to the first voltage value;

determining a second voltage value, a third voltage value, a second current value and a third current value according to the first voltage value and the first current value;

receiving an active power instruction value and a reactive power instruction value;

determining a first instruction current value and a second instruction current value according to the active power instruction value, the reactive power instruction value, the second voltage value and the third voltage value;

inputting the second current value, the third current value, the first instruction current value and the second instruction current value into a proportional integral controller, to render a first output result; and determining a first pulse width modulation signal according to the first output result, a feedback voltage of the power grid and the first angle value, and limiting the energy storage converter to operate according to the first pulse width modulation signal.

3. The control method for an energy storage converter according to claim 2, wherein the step of limiting the energy storage converter to operate in an island mode comprises:

obtaining the first current value on the power grid and the first voltage value of the capacitor on the power grid;

determining the first angle value according to the first voltage value;

determining the second voltage value, the third voltage value, the second current value and the third current value according to the first voltage value and the first current value;

receiving a given voltage value of the capacitor on the power grid;

inputting the given voltage value, the second voltage value and the third voltage value into the proportional integral controller to render a second output result;

inputting the second output result, the second current value and the third current value into the proportional integral controller to render a third output result;

receiving a given angle value and inputting the given angle value and the first angle value into the proportional integral controller to render a fourth output result; and determining a second pulse width modulation signal according to the third output result, the feedback voltage of the power grid and the fourth output result, and limiting the energy storage converter to operate according to the second pulse width modulation signal.

4. The control method for an energy storage converter according to claim 2, wherein the step of limiting the energy storage converter to operate according to an angle information and a compensation voltage value output by a virtual synchronous generator comprises:

determining an angle instruction value according to the angle information;

obtaining the first current value on the power grid and the first voltage value of the capacitor on the power grid;

determining the first angle value according to the first voltage value;

determining the second voltage value, the third voltage value, the second current value and the third current value according to the first voltage value and the first current value;

receiving the given voltage value of the capacitor on the power grid;

inputting the compensation voltage value, the given voltage value, the second voltage value and the third voltage value into the proportional integral controller to render a fifth output result;

inputting the fifth output result, the second current value and the third current value into the proportional integral controller to render a sixth output result;

inputting the angle instruction value and the first angle value into the proportional integral controller to render a seventh output result; and determining a third pulse width modulation signal according to the sixth output result, the feedback voltage of the power grid and the seventh output result, and limiting the energy storage converter to operate according to the third pulse width modulation signal.

5. The control method for an energy storage converter according to claim 1, further comprising:

in the case that an electrical signal transmitted by the power grid is received, determining that the power grid operates in the normal state; and in the case that the electrical signal transmitted by the power grid is not received, determining that the power grid operates in the abnormal state.

6. The control method for an energy storage converter according to claim 2, further comprising:

in the case that an electrical signal transmitted by the power grid is received, determining that the power grid operates in the normal state; and in the case that the electrical signal transmitted by the power grid is not received, determining that the power grid operates in the abnormal state.

7. The control method for an energy storage converter according to claim 3, further comprising:

in the case that an electrical signal transmitted by the power grid is received, determining that the power grid operates in the normal state; and in the case that the electrical signal transmitted by the power grid is not received, determining that the power grid operates in the abnormal state.

8. The control method for an energy storage converter according to claim 1, further comprising:

in the case that an electrical signal transmitted by the power grid is received, determining that the power grid operates in the normal state; and in the case that the electrical signal transmitted by the power grid is not received, determining that the power grid operates in the abnormal state.

9. The control method for an energy storage converter according to claim 4, further comprising:

in the case that an electrical signal transmitted by the power grid is received, determining that the power grid operates in the normal state; and in the case that the electrical signal transmitted by the power grid is not received, determining that the power grid operates in the abnormal state.

10. A computer readable storage medium, a program or an instruction is stored on the computer readable storage medium, when the program or the instruction is executed by a processor, the following steps are achieved:

obtaining an operation state of a power grid;

limiting an energy storage converter to operate in a grid-connected mode in the case that the power grid operates in a normal state;

limiting the energy storage converter to operate in an island mode in the case that the power grid operates in an abnormal state, wherein in the grid-connected mode, the energy storage converter uses active power and reactive power decoupling control, and in the island mode, the energy storage converter uses virtual magnetic flux control; and in response to a first instruction, limiting the energy storage converter to operate according to an angle information and a compensation voltage value output by a virtual synchronous generator.

11. The computer readable storage medium according to claim 10, wherein the step of limiting the energy storage converter to operate in a grid-connected mode comprises:

obtaining a first current value on the power grid and a first voltage value of a capacitor on the power grid;

determining a first angle value according to the first voltage value;

determining a second voltage value, a third voltage value, a second current value and a third current value according to the first voltage value and the first current value;

receiving an active power instruction value and a reactive power instruction value;

determining a first instruction current value and a second instruction current value according to the active power instruction value, the reactive power instruction value, the second voltage value and the third voltage value;

inputting the second current value, the third current value, the first instruction current value and the second instruction current value into a proportional integral controller, to render a first output result; and determining a first pulse width modulation signal according to the first output result, a feedback voltage of the power grid and the first angle value, and limiting the energy storage converter to operate according to the first pulse width modulation signal.

12. The computer readable storage medium according to claim 11, wherein the step of limiting the energy storage converter to operate in an island mode comprises:

obtaining the first current value on the power grid and the first voltage value of the capacitor on the power grid;

determining the first angle value according to the first voltage value;

determining the second voltage value, the third voltage value, the second current value and the third current value according to the first voltage value and the first current value;

receiving a given voltage value of the capacitor on the power grid;

inputting the given voltage value, the second voltage value and the third voltage value into the proportional integral controller to render a second output result;

inputting the second output result, the second current value and the third current value into the proportional integral controller to render a third output result;

receiving a given angle value and inputting the given angle value and the first angle value into the proportional integral controller to render a fourth output result; and determining a second pulse width modulation signal according to the third output result, the feedback voltage of the power grid and the fourth output result, and limiting the energy storage converter to operate according to the second pulse width modulation signal.

13. The computer readable storage medium according to claim 11, wherein the step of limiting the energy storage converter to operate according to an angle information and a compensation voltage value output by a virtual synchronous generator comprises:

determining an angle instruction value according to the angle information;

obtaining the first current value on the power grid and the first voltage value of the capacitor on the power grid;

determining the first angle value according to the first voltage value;

determining the second voltage value, the third voltage value, the second current value and the third current value according to the first voltage value and the first current value;

receiving the given voltage value of the capacitor on the power grid;

inputting the compensation voltage value, the given voltage value, the second voltage value and the third voltage value into the proportional integral controller to render a fifth output result;

inputting the fifth output result, the second current value and the third current value into the proportional integral controller to render a sixth output result;

inputting the angle instruction value and the first angle value into the proportional integral controller to render a seventh output result; and determining a third pulse width modulation signal according to the sixth output result, the feedback voltage of the power grid and the seventh output result, and limiting the energy storage converter to operate according to the third pulse width modulation signal.

14. The computer readable storage medium according to claim 10, wherein, when the program or the instruction is executed by a processor, the following steps are further achieved:

in the case that an electrical signal transmitted by the power grid is received, determining that the power grid operates in the normal state; and in the case that the electrical signal transmitted by the power grid is not received, determining that the power grid operates in the abnormal state.

15. A energy storage converter, comprising the computer readable storage medium according to claim 10.

* * * * *